(12) United States Patent
Uehara et al.

(10) Patent No.: US 7,851,540 B2
(45) Date of Patent: Dec. 14, 2010

(54) RESIN COMPOSITION AND MOLDED BODY MADE FROM SAME

(75) Inventors: Hiroshi Uehara, Chiba (JP); Masayoshi Yamaguchi, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 461 days.

(21) Appl. No.: 10/593,028

(22) PCT Filed: Feb. 17, 2005

(86) PCT No.: PCT/JP2005/002499

§ 371 (c)(1),
(2), (4) Date: Sep. 15, 2006

(87) PCT Pub. No.: WO2005/090466

PCT Pub. Date: Sep. 29, 2005

(65) Prior Publication Data

US 2008/0249219 A1 Oct. 9, 2008

(30) Foreign Application Priority Data

Mar. 17, 2004 (JP) .............................. 2004-077078

(51) Int. Cl.
C08L 53/00 (2006.01)
C08K 5/09 (2006.01)

(52) U.S. Cl. ...................... 524/505; 524/300

(58) Field of Classification Search .................. 524/505
See application file for complete search history.

(56) References Cited

U.S. PATENT DOCUMENTS

| | | | |
|---|---|---|---|
| 3,595,942 A | 7/1971 | Wald | |
| 5,272,236 A * | 12/1993 | Lai et al. ................. | 526/348.5 |
| 6,045,152 A | 4/2000 | Oda | |
| 6,184,291 B1 * | 2/2001 | Ahmed et al. ................. | 525/98 |
| 6,410,623 B1 | 6/2002 | Okuda | |

FOREIGN PATENT DOCUMENTS

| | | |
|---|---|---|
| EP | 1 312 640 A1 | 5/2003 |
| JP | 8-506610 | 7/1996 |
| JP | 08-231817 | 9/1996 |
| JP | 10-053688 | 2/1998 |
| JP | 10-501285 | 2/1998 |
| JP | 10-287775 | 10/1998 |
| JP | 11-335498 | 12/1999 |
| JP | 2000-309676 | 11/2000 |
| JP | 3191054 | 5/2001 |
| JP | 2002-173576 | 6/2002 |
| JP | 2002-322321 | 11/2002 |
| JP | 2002322321 A * | 11/2002 |
| JP | 2003-049321 | 2/2003 |
| JP | 2004-051676 | 2/2004 |
| WO | WO 95/27756 | 10/1995 |
| WO | WO 01/88000 | 11/2001 |
| WO | WO 02/14423 | 2/2002 |

OTHER PUBLICATIONS

Translation of JP 2002322321, Nov. 2002.*
Rafael van Grieken et al., Macromol. Symp., 2007, 259, 174-180.*
Supplementary European Search Report received in corresponding European Application No. 05710349.1 mailed Dec. 29, 2008.

* cited by examiner

Primary Examiner—Ling-Siu Choi
Assistant Examiner—Hui Chin
(74) Attorney, Agent, or Firm—Foley & Lardner LLP

(57) ABSTRACT

A resin composition having excellent moldability and a sufficiently high surface hardness, which is excellent in preventing oil bleed-out problems, is provided.

The present invention provides a resin composition comprising 100 parts by weight of an ethylene/1-butene random copolymer (a), 10 to 500 parts by weight of at least one styrene block copolymer (b), 10 to 140 parts by weight of an oil (c) relative to 100 parts by weight of the total amount of (a) and (b), and 0 to 500 parts by weight of a polypropylene resin (d) relative to 100 parts by weight of the total amount of (a) and (b), and a molded body made from the resin composition.

9 Claims, No Drawings

RESIN COMPOSITION AND MOLDED BODY MADE FROM SAME

TECHNICAL FIELD

The present invention relates to a block copolymer composition containing polyolefins.

BACKGROUND ART

An extrudable elastomer composition which can be easily extrusion molded or melt blow molded, is in general prepared by blending a styrene block copolymer and a crystalline polyolefin. By using such a blend, a variety of products including molded articles for automobiles and elastic films are produced.

When styrene block copolymers such as copolymers of styrene/butadiene/styrene, styrene/isoprene/styrene, styrene/ethylene-butene/styrene, and styrene/ethylene-propylene/styrene, are blended with other materials such as, for example, polyolefins or adhesiveness-imparting resins, extrudable elastomer compositions which can be more feasibly extruded to obtain elastic sheets having improved processability and/or bondability, are produced. Furthermore, recently, compositions of polyolefins which are obtained by using metallocene catalysts and styrene block copolymer are known. However, when such a resin composition contains oil as a bulking agent, there is a problem of oil bleed-out (Patent Documents 1 and 2).

[Patent Document 1] JP-A No. 8-231817
[Patent Document 2] Japanese Patent No. 3191054

DISCLOSURE OF THE INVENTION

It is an object of the present invention to solve the above-described problems, and to provide a resin composition which has excellent moldability and sufficiently high surface hardness, and is excellent in preventing oil bleed-out problems.

The present invention relates to a resin composition comprising 100 parts by weight of an ethylene/1-butene random copolymer (a), 10 to 500 parts by weight of at least one styrene block copolymer (b), 10 to 140 parts by weight o an oil (c) relative to 100 parts by weight of the total amount of (a) and (b), and 0 to 500 parts by weight of a polypropylene resin (d) relative to 100 parts by weight of the total amount of (a) and (b), and also to a molded body made from such a resin composition.

Effect of the Invention

Since the resin composition of the invention has excellent moldability and sufficient flexibility, the resin composition has less oil bleed-out problems. The resin composition according to the invention has excellent flexibility over a wide range of temperatures, as well as excellent thermal resistance. The resin composition according to the invention also has excellent moldability with respect to various molding techniques such as injection molding, extrusion molding and the like.

BEST MODE FOR CARRYING OUT THE INVENTION

(a) Ethylene/1-Butene Random Copolymer

The ethylene/1-butene random copolymer of the invention has a density (measured according to ASTM D-792) of 0.857 to 0.890 g/cm$^3$, preferably 0.857 to 0.870 g/cm$^3$, and an MFR (measured according to ASTM D-1238) of 0.1 to 10 g/10 min, preferably 0.1 to 5 g/10 min. The molecular weight distribution (Mw/Mn) of the ethylene/1-butene random copolymer of the invention, as measured by GPC, is 1.5 to 3.0, preferably 1.5 to 2.5. The ethylene/1-butene random copolymer of the invention contains 1-butene in an amount of 8 to 25% by mole, preferably 15 to 20% by mole. The ethylene/1-butene random copolymer has a melting point of lower than 90° C., as determined by differential scanning calorimetry (DSC), or the copolymer is non-crystalline, with no melting point being detected. The molecular structure of the ethylene/1-butene random copolymer of the invention may be liner or branched with long side chains. The ethylene/1-butene random copolymer of the invention preferably has a degree of crystallinity of less than 30%, and more preferably 20% or less, as measured by X-ray diffraction.

For the ethylene/1-butene random copolymer of the invention, the parameter indicating the randomness of the monomer sequence distribution in the copolymer (B value), as determined by 13C-NMR, is preferably in the range of 1.0 to 1.4. This B value is an index indicating the status of compositional distribution of the structural units in a copolymer sequence, and can be calculated from the following equation:

$$B\text{value}=POE/(2PO \cdot PE)$$

wherein PE and PO are a molar fraction of the ethylene component and a molar fraction of the α-olefin (1-butene) component, respectively, each of which components is contained in the ethylene.α-olefin random copolymer; and POE is a ratio of the number of ethylene.α-olefin (1-butene) alternating sequences to the number of the total dyad sequences.

Specifically, these PE, PO and POE values can be calculated as follows.

A sample is prepared in a 10-mm φ test tube, by uniformly dissolving about 200 mg of an ethylene/1-butene random copolymer in 1 ml of hexachlorobutadiene, and the 13C-NMR spectrum of this sample is measured under the conditions as described below:

[Measurement Conditions]

Measurement temperature: 120° C., measurement frequency: 20.05 MHz, spectrum width: 1500 Hz, filter width: 1500 Hz, pulse repetition time: 4.2 sec, pulse width: 7 μsec, and number of integrations: 2000 to 5000 times. The PE, PO and POE values can be determined from a 13C-NMR spectrum measured under the above-described conditions, based on the reports of G. J. Ray (Macromolecules, 10, 773 (1977)), J. C. Randall (Macromolecules, 15, 353 (1982)), K. Kimura (Polymer, 25, 4418 (1984)) and the like.

In addition, the B value determined from the above-described equation is 2 when the two monomers of an ethylene/1-butene random copolymer are distributed in an alternating manner, while the B value is 0 in the case of a complete block copolymer in which the two monomers are copolymerized in a completely separated manner.

For the ethylene/1-butene copolymer of the invention, the moldability is highly desirable if the ratio (MFR$_{10}$/MFR$_2$) of MFR$_{10}$ measured under a load of 10 kg and MFR$_2$ (may be also described as MFR) measured under a load of 2.16 kg, both being measured at 190° C. according to ASTM D-1238, and the molecular weight distribution (Mw/Mn) satisfy the relationship: Mw/Mn+4.63≦MFR$_{10}$/MFR$_2$≦14−2.9 Log (MFR$_2$).

The method of producing the ethylene/1-butene copolymer is not particularly limited, but the copolymer can be produced by copolymerizing ethylene and 1-butene using a Ziegler- Natta catalyst or a metallocene catalyst. More preferably, the ethylene/1-butene random copolymer is obtained by copolymerizing ethylene and 1-butene using a metallocene catalyst.

(b) Styrene Block Copolymer

The structure of the styrene block copolymers that are useful for the invention is not critical, and may be linear or radial, or may be diblock or triblock, or any combination thereof. The essential structure is preferably a triblock structure, and more preferably a linear triblock structure.

The production of the styrene block copolymers that are usefully used for the invention is not a subject matter of the present invention. The methods of producing such block copolymers are known in the related art. The catalyst which is suitable for the production of useful block copolymers having unsaturated rubber monomer units, includes catalysts based on lithium, in particular, lithium alkyl catalysts. U.S. Pat. No. 3,595,942 describes an appropriate method for producing a block copolymer having saturated rubber monomer units by subjecting a block copolymer having unsaturated rubber monomer units to hydrogenation. The structure of such polymer is determined by the method of polymerization thereof. For example, when desired rubber monomers are sequentially introduced into a reactor, with the use of an initiator such as a lithium alkyl compound, dilithiostilbene or the like, or when a block copolymer is bisegmentally coupled using a bifunctional coupling agent, a linear polymer is produced. Branched structures, on the other hand, may be obtained by the use of suitable coupling agents having a functionality with respect to the block copolymers with unsaturated rubber monomer units of three or more. Coupling can be also induced by polyfunctional coupling agents, for example, dihaloalkanes or alkenes, divinylbenzene and the like, as well as specific polar compounds, for example, silicon halides, siloxanes, esters of monohydric alcohols and carboxylic acids, and the like. The presence of any coupling residues in the polymer may be ignored for an adequate description of the block copolymers forming a part of the composition of this invention.

Suitable block copolymers having unsaturated rubber monomer units are not limited to the following, but include copolymers of styrene-butadiene (SB), styrene-isoprene (SI), styrene-butadiene-styrene (SBS), styrene-isoprene-styrene (SIS), α-methylstyrene-butadiene-α-methylstyrene, α-methylstyrene-isoprene-α-methylstyrene, and the like.

The styrene moiety of the block copolymer is suitably a polymer or an interpolymer of styrene, and analogues and homologues thereof (these include α-methylstyrene and ring-substituted styrenes, in particular, styrenes having methyl-substituted rings). Suitable styrenes include styrene and α-methylstyrene, and styrene is particularly preferred.

The block copolymer having unsaturated rubber monomer units may include homopolymers of butadiene or isoprene, and copolymers of either or both of the above-mentioned dienes and a small amount of styrene monomer. When this monomer being used is butadiene, it is suitable that 35 to 55% by mole of the condensed butadiene units in the butadiene polymer block has a 1,2-structure. Therefore, when such block is hydrogenated, the product resulting therefrom is a regular copolymer block consisting of ethylene and 1-butene (EB), or is analogous thereto. When the conjugated diene being used is isoprene, the hydrogenation product resulting therefrom is a regular copolymer block consisting of ethylene and propylene (EP), or is analogous thereto. A suitable block copolymer having saturated rubber monomer units contains at least one segment of the styrene unit, and at least one segment of an ethylene-butene or ethylene-propylene copolymer. Suitable examples of such block copolymers having saturated rubber monomer units include copolymers of styrene/ethylene-butene, copolymers of styrene/ethylene-propylene, copolymers of styrene/ethylene-butene/styrene (SEBS), and copolymers of styrene/ethylene-propylene/styrene (SEPS).

Hydrogenation of the block copolymers having unsaturated rubber monomer units is carried out, preferably by using a catalyst comprising the reaction products of an aluminum alkyl compound with nickel or cobalt carboxylates or alkoxides, under the conditions such that the degree of hydrogenation of the styrene aromatic double bonds is 25% or less, while at least 80% of the aliphatic double bonds are substantially completely hydrogenated. Suitable examples of the block copolymer include the block copolymers in which at least 99% of the aliphatic double bonds are hydrogenated, while the degree of hydrogenation of the aromatic double bonds is less than 5%.

The proportion of this styrene block is in general 8 to 65% by weight of the total weight of the block copolymer. These block copolymers contain 10 to 35% by weight of the styrene block segment and 90 to 65% by weight of the rubber monomer block segment based on the total weight of the block copolymer.

The average molecular weight of individual blocks is obtained as a variety within a specific range. In most cases, the number average molecular weight of the styrene block segment is in the range of 5,000 to 125,000, suitably in the range of 7,000 to 60,000, while the average molecular weight of the rubber monomer block segment is in the range of 10,000 to 300,000, suitably in the range of 30,000 to 150,000. The average molecular weight (Mn) of this block copolymer as a whole is typically in the range of 25,000 to 250,000, suitably in the range of 35,000 to 200,000. These molecular weights are most precisely measured by the tritium counting method or the osmotic pressure measurement method.

Furthermore, various block copolymers that are suitable for the use in the invention may be modification products thereof obtained by grafting a small amount of functional groups, for example, maleic anhydride or the like, by means of any method well known in the related art.

The block copolymers that are useful for the use in the invention are commercially available, and for example, are available from KRATON Polymers LLC under the tradename KRATON, and also from Dexco Polymers LP under the tradename VECTOR.

(c) Oil

The oil used for the invention is used as a bulking agent, and various oils such as paraffin oils, silicone oils and the like are used, with paraffin oils in particular being suitably used. The oil is suitably an oil having a dynamic viscosity at 40° C. of 20 to 800 cst (centistokes), preferably 40 to 600 cst, and further having a fluidity of 0 to −40° C., preferably 0 to −30° C., and an inflammation point (measured by COC method) of 200 to 400° C., preferably 250 to 350° C.

Naphthenic process oil, which is a kind of oil preferably used for the invention, is a petroleum-based softening agent generally incorporated to obtain the effects of softening, dispersion of the mixing agents, lubrication and the like, and contains 30 to 45% by weight of naphthenic hydrocarbons. When such process oil is mixed in, the melt flowability of the resin composition upon molding, or the flexibility of the molded article can be further improved, and further, there is obtained an effect that stickiness due to bleeding on the surface of molded articles hardly appears. According to the invention, among the naphthenic process oils, those containing 10% by weight or less of aromatic hydrocarbons are used. For some unclear reason, use of these naphthenic process oils leads to an effect that bleeding on the surface of molded articles hardly appears.

The amount of the oil to be blended according to the invention is 10 to 140 parts by weight, preferably 15 to 120 parts by weight, relative to 100 parts by weight of the total amount of the ethylene/1-butene random copolymer (a) and at least one styrene block copolymer (b). When the amount of the naphthenic process oil to be blended is too small, the melt flowability or the flexibility of the molded article may be insufficient. On the other hand, when the amount of the naphthenic process oil to be blended is too large, there is a possibility of the process oil bleeding out of the surface of molded articles, which is not desirable.

(d) Polypropylene Resin

The polypropylene resin of the invention may be exemplified by propylene homopolymers, and propylene-α-olefin random copolymers and propylene.α-olefin block copolymers consisting of propylene and other α-olefins other than propylene. The polypropylene resin may also be modified with polar group-containing monomers such as maleic anhydride and the like. For crystalline polypropylene resins, the isotactic structure and syndiotactic structure are known, but the isotactic structure is particularly preferable.

Preferred polypropylene resins are propylene homopolymers, propylene.α-olefin random copolymers containing 10% by mole or less, preferably 8% by mole or less, of the other α-olefin unit, and propylene.α-olefin block copolymers having an amount of n-decane extraction of 40% by weight or less, particularly 30% by weight or less.

In addition, according to the invention, the term "α-olefin unit" refers to a structural unit which is derived from α-olefin and constitutes a polymer. This reference is similarly applied to the ethylene unit, propylene unit, 1-butene unit and the like. According to the invention, the α-olefin includes ethylene.

For the other α-olefin constituting the propylene.α-olefin random copolymer or the propylene block copolymer, an α-olefin having 2 to 20 carbon atoms other than propylene may be preferably mentioned, and specifically, ethylene, 1-butene, 1-pentene, 1-hexene, 1-heptene, 1-octene, 1-decene, 1-dodecene, 1-hexadecene, 4-methyl-1-pentene and the like may be mentioned.

These α-olefins may be used individually or in combination of two or more species.

The polypropylene resin used for the invention can be produced by a method known per se, using a solid titanium catalyst or metallocene catalyst that is known per se.

The degree of crystallinity of the polypropylene resin measured by the X-ray method is preferably 40% or greater, and particularly preferably 50% or greater, and the melting point (Tm) measured by the DSC method is preferably 100 to 165° C. Furthermore, it is preferable to use a polypropylene resin having a higher melting point than the melting points of the ethylene.α-olefin random copolymer (b) and the propylene-.ethylene.1-butene random copolymer (c).

The polypropylene resin also has a melt flow rate as measured according to ASTM D1238 (MFR: 230° C., under a load of 2.16 kg) of usually 0.1 to 300 g/10 min, preferably 1 to 50 g/10 min. The polypropylene resin may be used individually or in combination of two or more species.

Resin Composition

The resin composition of the invention comprises 100 parts by weight of an ethylene/1-butene random copolymer (a), 10 to 500 parts by weight of at least one styrene block copolymer (b), 10 to 140 parts by weight of an oil (c) relative to 100 parts by weight of the total amount of (a) and (b), and 0 to 500 parts by weight of a polypropylene (d) relative to 100 parts by weight of the total amount of (a) and (b). Preferably, the resin composition comprises 10 to 300 parts by weight, more preferably 10 to 200 parts by weight, of the at least one styrene block copolymer (b) relative to 100 parts by weight of the ethylene/1-butene random copolymer (a). Also, the resin composition comprises preferably 15 to 120 parts by weight, more preferably 20 to 100 parts by weight, of the oil (c) relative to 100 parts by weight of the total amount of (a) and (b), and preferably 20 to 300 parts by weight, more preferably 20 to 200 parts by weight, of the polypropylene (d) relative to 100 parts by weight of the total amount of (a) and (b).

For the surface hardness (measured according to ASTM D2240), the resin composition of the invention has a Shore-A hardness of 15 to 95, preferably 15 to 85.

The resin composition of the invention may contain, if necessary, other synthetic resins or rubbers, or additives such as an antioxidant, a thermal-resistant stabilizer, a weather-resistant stabilizer, a slipping agent, an anti-blocking agent, a crystal nucleating agent, a pigment, and a hydrochloric acid absorbent, within the scope of not impairing the performance of the resin composition. The method of producing the resin composition of the invention is not particularly limited, and can be produced using a closed-type mixer such as a Banbury mixer and a kneader, usually used in the rubber/polymer industry, or a single-screw extruder, a twin-screw extruder or the like. For the method of compounding, a method of using an extruder having inlets at several cylinder area, and introducing the polymer components and various powdery additives from the inlets at the initial cylinder area (hopper), while injecting liquid components such as oil and the like from the inlets at the latter cylinder area, may be employed. Among the above-described various mixing methods, when a mixing method involving melting of the polymer components using, for example, an extruder or the like, is employed, it is preferable to add a process of grinding after compounding the component, in order to improve the powder flowability of the composition. For such grinding process, grinding can be performed by using a grinder such as a turbo mill, a roll mill, a ball mill, a centrifugal grinder, a pulverizer or the like, and thus, a resin composition having powder flowability can be produced.

In addition, it is possible to produce sheets by blending the above-mentioned components and, if necessary, various additives with a mixer such as a Henschel mixer, a Banbury mixer, a tumbler mixer, a roller and an extruder, and then feeding the blend to a known sheet molding machine for calendar molding, T-die molding or the like.

Molded Body

The molded body that can be obtained from the resin composition of the invention includes a blow molded body with excellent moldability, a sheet molded body, an extrusion molded body, or irregular shape extrusion molded body and injection molded body. According to the invention, upon producing a resin composition as described above, the respective components can be kneaded with excellent dispersibility. The resin composition according to the invention can be molded into molded articles of various shapes by employing known molding methods, without particular limitation. The novel composition of the invention can be processed into products, for example, fibers, films, coatings and molded products, by using any of the methods well known in the related art, which are appropriate to be used for thermoplastic compositions. This novel composition is particularly appropriate for producing manufactured articles by molding operation. The molding operations appropriate for use in producing useful manufactured articles or parts from this novel composition, include various injection molding methods (for example, the methods described in "Introduction to Injection Molding" on pages 264 to 268 and "Injection Molding Thermoplastics" on pages 270 to 271 of Modern Plastics Encyclopedia/89, Vol. 65, No. 11, published in mid-October, 1988), blow molding methods (for example, the methods described in "Extrusion-Blow Molding", Modern Plastics Encyclopedia/89, Vol. 65, No. 11, pp. 217-218, published in mid-October, 1988), profile extrusion processing, and the like. Several examples of such manufactured articles include sports goods, for example, a diving suit, a golf grip, etc.; containers for foodstuff, other household goods, etc.; a footwear counter, upper sole, etc.; automobile goods, for example, a fascia, a trim, a side molding, etc.; medical goods, for example, a glove, a tubing, a bag, an artificial limb, etc.; industrial goods, for example, a gasket, a tool grip, etc.; personal care goods, for example, elastic films and fibers for diaper, etc.; fabrics, for example, nonwoven fabrics, etc.; electronic goods, for example, a keypad, a cable jacket, etc.; and construction goods, for example, materials for roof thatching, expansion joint materials connecting expansive elastic pipes, etc. Furthermore, this novel composition is useful as a blending material or an additive, and is used for, for example, modification of asphalt for crack repairing and roof thatching, polymer processing, impact and surface modification, blending of sealants and adhesives, modification of viscosity of oil gels, blending of rubber bulking agent/binding agent, and the like.

Among these, molding into an injection molded body is preferred.

The injection molded articles of the resin composition according to the invention can be used for a wide range of applications, and can be suitably used in, for example, domestic appliance applications of such as a housing, a laundry sink, etc. (referred to as a molded body for home electronic appliances); film applications such as a uniaxial stretched film, a biaxial stretched film and an inflation film; sheet applications provided by calendar molding, extrusion molding, and the like, for example, automobile interior decoration applications such as instrument panel skin, etc., automobile exterior decoration applications such as side molding, mud guard, etc. (the automobile interior decoration applications and the automobile exterior decoration applications are together referred to as a molded body for automobiles); wiring applications; general miscellaneous goods applications, and the like.

Inter alia, the resin composition can be preferably used for the applications which can effectively utilize the characteristics of excellent flexibility, strength and thermal resistance, and of preventing the occurrence of oil bleed-out, for example, in automobile interior decoration coatings, consumer applications, and flexible parts for home electronic appliances.

EXAMPLES

Hereinafter, the present invention will be more specifically explained with reference to Examples, but the invention is not intended to be limited by the following Examples, within the scope of the subject matter of the invention. In addition, the ethylene/1-butene random copolymer was evaluated by the following methods.

Density

A strand was subjected to the measurement of MFR at 190° C. under a load of 2.16 kg, subsequently to heat treatment at 120° C. for 1 hour and gradual cooling to room temperature over 1 hour, and then to the measurement of the density by a density gradient column method.

MFR

The MFR value was measured at 190° C. under a load of 2.16 kg according to ASTM D-1238.

Mw/Mn

The Mw/Mn value was measured by GPC (gel permeation chromatography) at 140° C. using an ortho-dichlorobenzene solvent.

$MFR_{10}/MFR_2$

The $MFR_{10}$ value under a load of 10 kg and the $MFR_2$ value under a load of 2.16 kg were measured at 190° C. according to ASTM D-1238, and the ratio of the two values was calculated. A large value of this ratio indicates excellent flowability of the polymer upon melting, that is, high processability.

Ethylene/1-butene random copolymer: Ethylene.1-butene copolymer 1 and ethylene.1-butene copolymer 2 were adjusted (prepared) as described in the following Production Examples 1 and 2.

Production Example 1

Production of ethylene.1-butene Copolymer

[Production of Catalyst Solution]

18.4 mg of triphenylcarbenium (tetrakispentafluorophenyl)borate was taken and dissolved in 5 ml of toluene to produce a toluene solution at a concentration of 0.004 mM/ml. 1.8 mg of [dimethyl(t-butylamide)(tetramethyl-η5-cyclopentadienyl)silane]titanium dichloride was taken and dissolved in 5 ml of toluene to produce a toluene solution at a concentration of 0.001 mM/ml. Upon the initiation of polymerization, 0.38 ml of the toluene solution of triphenylcarbenium (tetrakispentafluorophenyl)borate, and 0.38 ml of the toluene solution of [dimethyl(t-butylamide)(tetramethyl-η5-cyclopentadienyl)silane]titanium dichloride were taken, and 4.24 ml of toluene was further added for dilution, to produce 5 ml of a toluene solution containing 0.002 mM/L (in terms of B) of triphenylcarbenium(tetrakispentafluorophenyl)borate and 0.0005 mM/L (in terms of Ti) of [dimethyl(t-butylamide) (tetramethyl-η5-cyclopentadienyl)silane]titanium dichloride.

Production of ethylene.1-butene Copolymer 1

750 ml of heptane at 23° C. was introduced into an autoclave made of SUS and having a capacity of 1.5 liters, which is equipped with agitating blades and has been sufficiently purged with nitrogen. To this autoclave, 20 g of 1-butene and 40 ml of hydrogen were introduced, while rotating the agitating blades and ice-cooling. Next, the autoclave was heated to 100° C., and was also pressurized with ethylene to achieve a total pressure of 6 KG. At the time point where the internal pressure of the autoclave reached 6 KG, 1.0 ml of a 1.0 mM/ml hexane solution of triisobutylaluminum (TIBA) was pressure injected using nitrogen. Subsequently, 5 ml of the catalyst solution thus produced was pressured injected into the autoclave with nitrogen. Then, for 5 minutes, the temperature of the autoclave was adjusted to an internal temperature of 100° C., while ethylene was directly supplied to a pressure of 6 KG. After 5 minutes of polymerization initiation, 5 ml of methanol was introduced into the autoclave by pumping to stop the polymerization, and the autoclave was depressurized to the atmospheric pressure. 3 liters of methanol was poured into the reaction solution, while agitating. The resulting polymer containing the solvent was dried at 130° C. and 600 Torr for 13 hours to obtain 6 g of ethylene.butene copolymer 1. The properties of the obtained ethylene.1-butene copolymer are presented in Table 1.

Production Example 2

Production of ethylene.1-butene Copolymer 2

[Production of Catalyst Solution]

0.63 mg of bis(1,3-dimethylcyclopentadienyl)zirconium dichloride was introduced into a flask made of glass, which has been sufficiently purged with nitrogen, and 1.57 ml of a toluene solution of methyl aluminoxane (Al; 0.13 millimoles/liter) and 2.43 ml of toluene were added to the flask to obtain a catalyst solution.

Production of ethylene.1-butene Copolymer 2

To an autoclave made of stainless steel and having an internal capacity of 2 liters, which has been sufficiently purged with nitrogen, 912 ml of hexane, 320 ml of 1-butene and 0 ml of hydrogen were introduced, and the temperature in the system was raised to 80° C. Subsequently, 0.9 millimoles of triisobutylaluminum and 2.0 ml (0.0005 millimoles in terms of Zr) of the above-produced catalyst solution were pressure injected using ethylene to initiate polymerization. The total pressure was maintained at 8.0 kg/cm$^2$-G by continuously supplying ethylene, and the polymerization was carried out at 80° C. for 30 minutes.

A small amount of ethanol was introduced into the system to stop polymerization, and then unreacted ethylene was purged. The resulting polymer was introduced in a large excess of methanol to precipitate out the polymer. This polymer was recovered by filtration, and dried overnight under reduced pressure, to obtain ethylene.1-butene copolymer 2. The properties of the obtained ethylene.1-butene copolymer 2 are presented in Table 1.

TABLE 1

| Polymer properties | Production Example 1 Ethylene•1-butene copolymer 1 | Production Example 2 Ethylene•1-butene copolymer 2 |
|---|---|---|
| Density (kg/m$^3$) | 860 | 861 |
| Melt flow rate (190° C.) | 1.1 | 0.5 |
| Mw/Mn | 2.1 | 1.1 |
| MFR$_{10}$/MFR$_{2.16}$ | 8.5 | 6.0 |

[Evaluation of Resin Composition]

The resin composition was evaluated by the following methods.

Tear Strength

The tear strength was measured by performing the tensile test according to JIS K7113, using a JIS No. 2 dumbbell.

Shore-A Hardness

The Shore-A hardness value was measured according to ASTM D-2240, using a sheet having a thickness of 3 mm and using a durometer.

Oil Bleed

Samples were produced using a press sheet having a thickness of 2 mm, and then were left to stand for 24 hours, 48 hours, 120 hours, 240 hours and 2 weeks, respectively, at normal temperature. Then, the oil bleed on the sample surfaces was evaluated by naked eyes.

[Materials Other Than Ethylene/1-Butene Random Copolymer]

Styrene block copolymer: Kraton G1650 manufactured by Kraton Polymer LLC, which is a styrene.ethylene.butene.styrene block copolymer.

Polypropylene resin: a propylene block copolymer, MFR: 23 g/10 min (230° C.), amount of n-decane extraction: 12 wt %

Ethylene/octane random copolymer (EOR): Engage EG8150 manufactured by DuPont Dow Elastomers LLC, density: 868 kg/m$^3$, MFR: 0.5 g/10 min (190° C.)

Oil: paraffin oil PW-90 manufactured by Idemitsu Kosan Co., Ltd. (dynamic viscosity at 40° C.: 95.5 cst)

Examples 1 to 6 and Comparative Examples 1 to 3

Examples 1 to 6 use the ethylene.1-butene copolymer 1 and ethylene.1-butene copolymer 2 produced by the above-described production methods as the ethylene/1-butene random copolymer, while Comparative Examples 1 to 3 use the ethylene/octane random copolymer (EOR). Moreover, in Examples 1 to 6 and Comparative Examples 1 to 3, the above-mentioned styrene.ethylene.butene.styrene block copolymer G1650 as the styrene block copolymer, the above-mentioned paraffin oil as the oil, and the above-mentioned propylene block copolymer as the polypropylene resin were mixed in accordance with the proportions indicated in Table 1, and the mixtures were melt kneaded at a resin temperature of 190° C. using a twin-screw extruder (TEX30 mm) and were granulated to obtain pellets of the thermoplastic resin compositions. These thermoplastic resin compositions were subjected to the evaluation of the properties by the methods described above. The results are presented in Table 2.

TABLE 2

| | | Ex. 1 | Ex. 2 | Comp. Ex. 1 | Ex. 3 | Ex. 4 | Comp. Ex. 2 | Ex. 5 | Ex. 6 | Comp. Ex. 3 |
|---|---|---|---|---|---|---|---|---|---|---|
| Composition | (a) | 50 | | | 50 | | | 50 | | |
| | (b) | | 50 | | | 50 | | | 50 | |
| | EOR | | | 50 | | | 50 | | | 50 |
| | G1650 | 50 | 50 | 50 | 50 | 50 | 50 | 50 | 50 | 50 |
| | Polypropylene | 20 | 20 | 20 | 20 | 20 | 20 | 20 | 20 | 20 |
| | Paraffin oil | 120 | 120 | 120 | 130 | 130 | 130 | 140 | 140 | 140 |
| TS | MPa | 8 | 9 | 11 | 6 | 7 | 9 | 5 | 5 | 6 |
| Shore-A | — | 33 | 32 | 45 | 18 | 18 | 30 | 15 | 14 | 27 |
| Oil bleed | 24 hr | ◯ | ◯ | ◯ | ◯ | ◯ | ◯ | ◯ | ◯ | ◯ |
| | 48 hr | ◯ | ◯ | ◯ | ◯ | ◯ | ◯ | ◯ | ◯ | ◯ |
| | 120 hr | ◯ | ◯ | ◯ | ◯ | ◯ | ◯ | ◯ | ◯ | ◯ |

TABLE 2-continued

|  | Ex. 1 | Ex. 2 | Comp. Ex. 1 | Ex. 3 | Ex. 4 | Comp. Ex. 2 | Ex. 5 | Ex. 6 | Comp. Ex. 3 |
|---|---|---|---|---|---|---|---|---|---|
| 240 hr | ○ | ○ | ○ | ○ | ○ | ○ | ○ | ○ | ○ |
| 2 weeks | ○ | ○ | X | ○ | ○ | X | ○ | ○ | X |

(a): Ethylene·1-butene copolymer 1
(b): Ethylene·1-butene copolymer 2
Oil bleed
○: Not observed (good)
X: Observed (poor)

INDUSTRIAL APPLICABILITY

The thermoplastic elastomer composition according to the present invention has excellent moldability with respect to molding processes such as injection molding or extrusion molding, and at the same time, can provide molded articles having flexibility and strength and less oil bleeding. This thermoplastic elastomer composition can be used for a variety of applications, including food applications, daily miscellaneous goods applications, toy applications, sports goods application, stationery applications, office instrument applications, automobile interior decoration applications, automobile exterior decoration application, electrical appliances applications, wiring applications, civil/construction applications, medical instrument applications, sanitary goods, materials for chemical/mining industries, materials for agriculture/marine industries, and the like.

The invention claimed is:

1. A resin composition consisting essentially of 100 parts by weight of an ethylene/1-butene random copolymer (a), 10 to 500 parts by weight of at least one styrene block copolymer (b), 10 to 140 parts by weight of an oil (c) relative to 100 parts by weight of the total amount of (a) and (b), and 0 to 500 parts by weight of a polypropylene resin (d) relative to 100 parts by weight of the total amount of (a) and (b),
wherein ethylene/1-butene random copolymer (a) contains 1-butene in an amount of 8 to 25% by mol, and
the ratio ($MFR_{10}/MFR_2$) of $MFR_{10}$ measured under a load of 10 kg and $MFR_2$ (also described as MFR) measured under a load of 2.16 kg, both being measured at 190° C. according to ASTM D-1238, and the molecular weight distribution (Mw/Mn) of the ethylene/1-butene random copolymer (a) satisfy the relationship:

$$Mw/Mn + 4.63 \leq MFR_{10}/MFR_2 \leq 14 - 2.9 \, Log(MFR_2).$$

2. The resin composition according to claim 1, wherein the ethylene/1-butene random copolymer (a) has a density (measured according to ASTM D-792) of 0.857 to 0.890 g/cm³, an MFR (measured according to ASTM D-1238) of 0.1 to 10 g/10 min, and a molecular weight distribution of 1.5 to 3.0 as measured by GPC, and the at least one styrene block copolymer (b) is selected from the group consisting of copolymers of styrene/butadiene/styrene, styrene/isoprene/styrene, styrene/ethylene-butene/styrene and styrene/ethylene-propylene/styrene.

3. A molded body comprising the resin composition according to claim 1.

4. An injection molded body comprising the resin composition according to claim 1.

5. An extrusion molded body comprising the resin composition according to claim 1.

6. A sheet or film comprising the resin composition according to claim 1.

7. A fabric or non-woven fabric comprising the resin composition according to claim 1.

8. A molded body for automobiles, comprising the resin composition according to claim 1.

9. A molded body for domestic appliances, comprising the resin composition according to claim 1.

* * * * *